(12) United States Patent
Engdal (10) Patent No.: US 10,974,698 B2
(45) Date of Patent: Apr. 13, 2021

(54) WINDSCREEN WIPER CONNECTOR ASSEMBLY FOR A VEHICLE

(71) Applicant: Volvo Truck Corporation, Gothenburg (SE)

(72) Inventor: Sara Engdal, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/044,062

(22) PCT Filed: Apr. 3, 2018

(86) PCT No.: PCT/EP2018/025087
§ 371 (c)(1),
(2) Date: Sep. 30, 2020

(87) PCT Pub. No.: WO2019/192666
PCT Pub. Date: Oct. 10, 2019

(65) Prior Publication Data
US 2021/0053533 A1 Feb. 25, 2021

(51) Int. Cl.
*B60S 1/40* (2006.01)
*B60S 1/52* (2006.01)
*B60S 1/38* (2006.01)

(52) U.S. Cl.
CPC ............ *B60S 1/40* (2013.01); *B60S 1/3862* (2013.01); *B60S 1/4083* (2013.01); *B60S 1/524* (2013.01); *B60S 2001/4096* (2013.01)

(58) Field of Classification Search
CPC .......... B60S 1/40; B60S 1/524; B60S 1/3862; B60S 1/4083; B60S 2001/4096;
(Continued)

(56) References Cited

U.S. PATENT DOCUMENTS 2,432,693 A * 12/1947 Anderson ............. B60S 1/4006
15/250.32
2,668,725 A * 2/1954 Deibel ................. B60S 1/4006
403/220
(Continued)

FOREIGN PATENT DOCUMENTS

GB 660286 * 11/1951
WO 2011/005908 A2 1/2011
WO 2012/065639 A1 5/2012

OTHER PUBLICATIONS

International Search Report and Written Opinion for PCT/EP2018/025087, dated Dec. 10, 2018, 8 pages.

*Primary Examiner* — Gary K. Graham
(74) *Attorney, Agent, or Firm* — Withrow & Terranova PLLC (57) ABSTRACT

The invention relates to a wiper connector assembly (10) for a vehicle (1), comprising a wiper blade connector part (12) and a wiper arm connector part (14), wherein one of the wiper arm connector part and the wiper blade connector part is a male connector (22) and the other one a female connector (24) for connecting the wiper blade connector part to the wiper arm connector part, wherein the male connector (22) has a biased protrusion (15) extending from an exterior (23) of the male connector in a radial direction (R) of the male connector and having a visual indicator portion (16), said male connector further comprising a user-operable arm (18) configured to cooperate with the biased protrusion and having a tab portion (19) reachable by a user from an outside of the male connector; the female connector (24) defines an interior surface (25) and comprises a groove (40) disposed on the interior surface, said groove defining a path (41) for the biased protrusion of the male connector and having a groove end (45) comprising a through hole for said biased protrusion; the groove path having at least a first path section
(Continued)

(42) extending substantially in an axial direction (A) and a subsequent second path section (43) extending from the first path section and substantially in a circumferential direction (C) along said interior surface of said female connector.

11 Claims, 9 Drawing Sheets

(58) Field of Classification Search
CPC .... B60S 2001/409; F16B 21/00; F16B 21/06; F16B 21/08; F16B 21/09
USPC ...... 15/250.32, 250.04; 403/322.4, 325, 326, 403/327, 328, 329, 330
See application file for complete search history.

(56) References Cited

U.S. PATENT DOCUMENTS

| | | |
|---|---|---|
| 6,463,621 B1 | 10/2002 | Zimmer et al. |
| 8,201,301 B2 | 6/2012 | Jeong |
| 2006/0059647 A1 | 3/2006 | Ostrowski |
| 2012/0117748 A1 | 5/2012 | Aznag et al. |
| 2012/0284948 A1 | 11/2012 | Guidez |
| 2016/0075308 A1 | 3/2016 | Mouleyre et al. |
| 2017/0066412 A1 | 3/2017 | Waible |
| 2017/0341628 A1* | 11/2017 | Weiler ..................... B60S 1/42 |

* cited by examiner

WINDSCREEN WIPER CONNECTOR ASSEMBLY FOR A VEHICLE

This application is a 35 USC 371 national phase filing of International Application No. PCT/EP2018/025087, filed Apr. 3, 2018, the disclosure of which is incorporated herein by reference in its entirety.

TECHNICAL FIELD

The invention relates to a wiper connector assembly for a vehicle. The invention also relates to a windscreen wiper system comprising a wiper arm, a wiper blade and such a wiper connector assembly. Moreover, the invention relates to a vehicle comprising such a wiper connector assembly or windscreen wiper system. The invention is applicable on vehicles, in particular heavy-duty vehicles, such as trucks, buses and construction equipment. Although the invention will be described in relation to a truck, the invention is not restricted to this particular vehicle, but may also be used in other types of vehicles such as cars, working machines within the fields of industrial construction machines or construction equipment, such as articulated haulers, dump trucks, wheel loaders and the like.

BACKGROUND

In connection with windscreens of vehicles, in particular front windscreens of vehicles, such as heavy-duty vehicles, a windscreen wiper system is often used. The windscreen wiper system is generally used to remove rain, snow, ice and debris from the windscreen. While there is a number of different types of windscreen wiper systems, a conventional wiper system generally consists of a wiper arm pivotally attached at one end to the windscreen or in close proximity to the windscreen and with a long rubber wiper blade attached to the other end. The wiper arm is generally powered by a motor, often an electric motor, although pneumatic power may also be used in some types of vehicles. By articulating the wiper arm via the motor, the wiper blade is swung back and forth over the windscreen, pushing water or other precipitation from its surface. The speed of the wiper blade is normally adjustable, with several continuous speeds. In other words, a windscreen wiper system typically includes the wiper blade and the wiper arm articulated arranged proximate the windscreen allowing the wiper blade to move along the surface of the windscreen.

Eventually, wiper blades are worn out during ordinary use of the windscreen wiper system, partly as the blades are often made of rubber. In order to permit easy replacement of worn-out parts of the windscreen wiper system, the wiper blade is often releasable connected to the wiper arm. The wiper blade can be connected to the wiper arm in several different ways, however, there are two common types of connectors for connecting wiper blades to a wiper arm; a threaded connection and a bayonet connection. For the threaded connection, the wiper blade is generally rotationally aligned with a thread of the wiper arm and then screwed into the wiper arm allowing the wiper blade and wiper arm to connect.

US 2006/0059647 A1 discloses one example of a bayonet connection, in which a connecting device for a wiper blade on a wiper arm is provided. The connecting device has an inner adapter bracket part with two opposite arranged grooves for a bayonet closure. Two corresponding guiding pins are placed interior of the wiper arm to engage with the grooves in the closure position. In addition, there is a spring device arranged on the outer end part of the adapter bracket for securing the closure position. In another example, as disclosed in relation to FIGS. 11a-11c and FIG. 12, there is provided a connecting devices, in which the adapter bracket has a latching knob for locking with a matching opening on the end part of the wiper arm.

Although these connectors are generally useable for various types of vehicles such as heavy-duty vehicles, there is still a need for an improved wiper connector assembly as well as a windscreen wiper system allowing the wiper blade to be easily and intuitively connected and disconnected to the wiper arm.

SUMMARY

It is an object of the present invention to provide an improved wiper connector assembly for a vehicle, which assembly comprises a male connector and a female connector for engaging a wiper blade to a wiper arm in a practical and user-friendly manner, while providing a visual indication to a user of a locking state of the wiper connector assembly. The object is at least partly achieved by a wiper connector assembly to claim 1.

According to a first aspect of the present invention, there is provided a wiper connector assembly for a vehicle. The wiper connector assembly comprises a wiper blade connector part and a wiper arm connector part. Moreover, one of the wiper arm connector part and the wiper blade connector part is a male connector and the other one a female connector for connecting the wiper blade connector part to the wiper arm connector part. The male connector has a biased protrusion extending from an exterior of the male connector in a radial direction of the male connector. The biased protrusion has a visual indicator portion. Further, the male connector comprises a user-operable arm configured to cooperate with the biased protrusion. The user-operable arm has a tab portion reachable by a user from an outside of the male connector.

The female connector defines an interior surface and comprises a groove disposed on the interior surface. The groove defines a path for the biased protrusion of the male connector and has a groove end comprising a through hole for the biased protrusion.

The groove path has at least a first path section extending substantially in an axial direction and a subsequent second path section extending from the first path section and substantially in a circumferential direction along the interior surface of the female connector.

The male connector is connectable to the female connector by inserting a front end of the male connector in a receiving end of the female connector and displacing the biased protrusion in the first path section and subsequently in the second path section to the groove end. To this end, the biased protrusion is permitted to move outwards in the radial direction, thereby fixating the male connector relative the female connector, while providing a visible indication of a fixation position to a user by the visual indicator portion.

In this manner, the example embodiments of the invention provides a practical twist-and-lock function of the male connector relative the female connector of the wiper connector assembly, while enabling the user to get feedback that the wiper blade is locked in a correct and secure position.

By the provision of having female connector with an interior groove path and a male connector with an outer biased protrusion, it becomes possible to provide a wiper connector assembly that is both easy to understand by a user and easy to mount as soon as the biased protrusion is located in the groove path.

Moreover, by having a groove path extending in two directions due to the first path section and the section path section, and by having the through hole for accommodating the biased protrusion in the groove end position, the locking state or engagement state of the wiper connector assembly can be obtained by a movement of the male user via the groove path until the fixation position, which typically corresponds to the groove end. In this manner, the example embodiments of the invention provide a user-friendly wiper connector assembly that can be set in its locking state by one hand. This is particularly useful when replacing a worn-out wiper blade with a new wiper blade on a front windscreen of a heavy-duty vehicle as the distance to the windscreen from the ground is rather high, thus making the replacement more troublesome compared to e.g. a windscreen of a car. Accordingly, the wiper connector assembly provides a simple and intuitive configuration for connecting a wiper blade to a wiper arm, yet being secure during ordinary use of the wiper system. In addition, it is also believed that the wiper blade can be connected to the wiper arm in a relatively fool proof manner as soon as the biased protrusion is located in the groove path.

By the provision of having a user-operable arm configured to cooperate with the biased protrusion and further a tab portion reachable by the user from the outside of the male connector, the release of the fixation position between the male connector and the female connector can be performed in a simple and quick manner, yet allowing for release and dismount of the connector assembly with one hand.

The male connector and the female connector are maintained in the engaged state by having the biased protrusion located in the through hole (end point of the groove), while permitting the male connector and the female connector to release from each other in a non-operational state when a user manipulates the user-operable arm to effect a movement of the biased protrusion inwardly in the radial direction. To release the male connector from the female connector in a simple manner is particularly useful when there is a need for replacement of an old wiper blade with new wiper blade.

When the biased protrusion is pushed inwardly in the radial direction, the male connector is capable of displacing from the female connector by displacing the male connector via the groove of the female connector.

Another example advantage of having a groove with a first path section and a second part section extending in different directions is that the male connector is less likely to be accidently separated from the female connector even if the biased protrusion for some reason would fail to maintain the fixation position between the male and female connector. That is, the male connector is required to be displaced at least in two different directions (i.e. axial movement and rotational movement) in order to completely separate the male connector from the female connector.

Typically, the through hole of the female connector is dimensioned to match the dimensions of the biased protrusion. In this manner, the through hole prevents the biased protrusion, and thus the male connector, from displacing in the axial direction and the circumferential direction. Accordingly, the male connector is non-rotational engaged with the female connector in the fixation position of the connector assembly.

By way of example, the biased protrusion is a cylindrical shaped pin connected to the user-operable arm. Typically, although not strictly required, the biased protrusion has a uniform and symmetrical cross section. For instance, the cross section of the biased protrusion is symmetrical and uniform along an axis of symmetry. Thus, in one example embodiment, the biased protrusion has a circular cross section. In another example embodiment, the biased protrusion has a cross section in the form of a square. However, the biased protrusion may have another type of cross section than a circular cross section such as non-symmetrical and/or non-uniform cross sections. By way of example, the biased protrusion can have a cross section in the form of a parallelogram, such as a rectangular cross section, or an oval cross section, a triangular cross section or any other type of cross sectional shape as long as the groove of the female connector also is configured to accommodate the biased protrusion so that the male connector and the female connector can provide the twist-and-lock function of the male connector relative the female connector. If the biased protrusion has a non-symmetrical and/or non-uniform cross section, the dimensions of the first groove path and the second groove path are adapted to match the dimensions of the biased protrusion. Analogously, a biased protrusion having a non-uniform cross section can be designed to match the dimension of first groove path and the dimension of the second groove path. In one example when the biased protrusion has e.g. a rectangular cross section with two pair of opposite sides including a first pair of opposite sides with a first length and a second pair of opposite sides with a second length, the first groove path is configured to match the first length, while the second groove path is configured to match the second length. It should be readily appreciated that the dimension of the first length is different than the dimension of the second length in a rectangle. One example advantage with this example is that the intuitiveness and security of the locking function between the male connector and the female connected is further improved.

As mentioned above, the male connector has a biased protrusion extending from an exterior of the male connector in the radial direction of the male connector. In particular, the biased protrusion is movable between an inner radial position and an outer radial position. Further, as mentioned above, the biased protrusion has a visual indicator portion. In particular, the visual indicator portion is disposed on an end portion of the biased protrusion. To this end, the biased protrusion is permitted to move outwards in the radial direction from the inner radial position to the outer radial position, in which the visual indicator portion provides a visible indication of the fixation position between the male connector and the female connector when the biased protrusion is in the outer radial position. In one example embodiment, the visual indicator portion is an integral part of the biased protrusion. Thus, in this example embodiment, the biased protrusion also forms the visual indicator portion, which means that no other components are required to provide the visual indication of the fixation position. In another example embodiment, the visual indicator portion is a separate part connected to the biased protrusion.

Typically, the biased protrusion is configured to move between a release position and the fixation position. The release position typically corresponds to the inner radial position of the biased protrusion, while the fixation position typically corresponds to the outer radial position of the biased protrusion. By way of example, the biased protrusion is configured to move between the release position and the fixation position by means of a spring acting on the biased protrusion in the radial direction. Accordingly, the biased protrusion is typically, although not strictly necessary, a spring biased protrusion operable between the release position and the fixation position.

By way of example, the biased protrusion is configured to displace outwards in the radial direction from the male connector. In particular, the biased protrusion is displaceable between the inner release radial position and the outer fixation radial position. When the biased protrusion is in the fixation position, the biased protrusion projects outwardly from the exterior of the male connector.

The biased protrusion is to engage with the female connector when the male connector is fully inserted into the female connector, i.e. when the biased protrusion is in the groove end corresponding to the through hole.

Typically, the male connector comprises the user-operable arm and the tab portion. The tab portion is configured to cooperate with the biased protrusion. The user-operable arm is connected to the biased protrusion and reachable by a user from an outside of the male connector.

Typically, the exterior of the male connector is a circumferential surface of the male connector. Typically, the user-operable arm extends generally in the axial direction of the male connector part. In addition, the user-operable arm is typically spring-biased connected to the male connector. Typically, the biased protrusion is fully retracted by the user-operable arm during insertion of the male connector part.

According to one example embodiment, the male connector comprises space for accommodating the user-operable arm. By way of example, the male connector comprises a recess defining the space for accommodating the user-operable arm, wherein the recess extends generally in the axial direction of the male connector part. In addition, the user-operable arm is typically spring-biased connected to the recess of the male connector.

According to one example embodiment, the male connector is a part of the wiper blade connector part and the female connector is part of the wiper arm connector part. Alternatively, the female connector is a part of the wiper blade connector part and the male connector is part of the wiper arm connector part.

Typically, although not strictly required, the biased protrusion of the male connector is radially displaceable towards the exterior of the male connector by operating the tab portion of the user-operable arm inwardly in the radial direction, thereby releasing the male connector from the fixation position with the female connector.

According to one example embodiment, the groove path has a third path section extending substantially in the axial direction from the second path section. In this manner, the secureness of the twist-lock function is further improved.

According to one example embodiment, the wiper connector assembly comprises a fluid passage for the flow of washerfluid there through, the passage extending through the male connector and the female connector. A fluid passage for the flow of washerfluid provides a channel for transporting washerfluid from the wiper arm to the wiper blade. In this manner, the wiper connector assembly allows for an effective arrangement of a washer fluid system. By way of example, it becomes possible to transport washerfluid directly to the wiper blade, thus removing the need for having washerfluid tubes outside the connector assembly, wiper arm and the wiper blade. If the wiper connector assembly comprises the fluid passage, the wiper blade is typically configured to permit washerfluid to be transported within and/or along the blade.

The washerfluid passage provides a system for spraying water or an antifreeze window washer fluid at the windshield using several nozzles. The windshield washer system helps to remove dirt or dust from the windshield when it is used in concert with the wiper blades. When antifreeze windshield washer fluid is used, it can help the wipers to remove snow or ice. For winter conditions, some vehicles have additional heaters aimed at the windows or embedded heating wire in the glass. These defroster systems help to keep snow and ice from building up on the windshield.

According to one example embodiment, the wiper connector assembly comprises a sealing arranged to provide a fluid-tight connection for the passage in-between the male connector part and the female conneceter part.

Typically, the sealing cooperates with a front end surface of the exterior of the male connector and an internal surface of the interior of the female connector for providing the fluid-tight connection there between.

According to one example embodiment, the shape of the male connector part resembles a cylinder. The male connector generally has a circular cross section. That is, the male connector resembles a cylinder with a circular cross section and extending a length in a length direction. However, the male connector may at least in some sections be designed in other ways as long as the male connector is capable of providing the twist-and-lock function relative the female connector. In other words, the shape of the male connector is adapted to permit an axial movement and a rotational movement within the female connector. It is to be noted that the male connector may be designed with a tolerance relative the interior of the female connector. The male connector is typically at least partly made of a solid material, such as lightweight steel, aluminium, plastic material or similar material. According to one example embodiment, a front end of the male connector part resembles a truncated cone. In this manner, the male connector is shaped to be insertable in a more intuitively manner.

According to one example embodiment, the shape of the female connector part resembles a hollow cylinder. Thus, the female connector is typically shaped as a hollow cylinder with an exterior surface and an interior surface defining an inner volume. By way of example, the inner volume is shaped to match the dimensions of the male connector. However, in some example embodiments, the dimensions and shapes of the female and male connectors may differ to some extent as long as the connectors can form a connector assembly as mentioned above. Further, the female connector is typically at least partly made of a solid material, such as lightweight steel, aluminium, plastic material or similar material. According to one example embodiment, the interior of the female connector defines an inner truncated cone-shaped space and a cylindrical-shaped space extending from the inner truncated cone-shaped space to the receiving end of the female connector. In this manner, the inner shape of the female connector is shaped to match a truncated male connector, as mentioned above. According to one example embodiment, the exterior shape of the female connector part is defined by a circular circumference and extends a length in a length direction of the female connector. However, the female connector may at least in some sections be designed in other ways as long as the female connector is capable of providing the twist-and-lock function relative the male connector.

According to a second aspect of the present invention, there is provided a windscreen wiper system comprises a wiper arm, a wiper blade and a wiper connector assembly according to any one of the example embodiments described above in relation to the first aspect. The wiper arm is moreover connected to the wiper blade by the wiper connector assembly.

According to one example embodiment, the windscreen wiper system comprises a washer fluid hose for transporting washerfluid there through.

Effects and features of the second aspect are largely analogous to those described above in relation to the first aspect.

According to a third aspect of the present invention, there is provided a vehicle, in particular a truck, such as a heavy-duty truck, comprising a front windscreen and a wiper connector assembly according to any one of the example embodiments described above in relation to the first aspect and/or a windscreen wiper system according to any one of the example embodiments described above in relation to the second aspect. The invention is not limited to trucks and heavy-duty trucks. Rather, the vehicle may be any type of vehicle, such as a truck, car, working machine intended for carrying out an operation etc.

Effects and features of the third aspect are largely analogous to those described above in relation to the first aspect and/or second aspects.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 4;

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
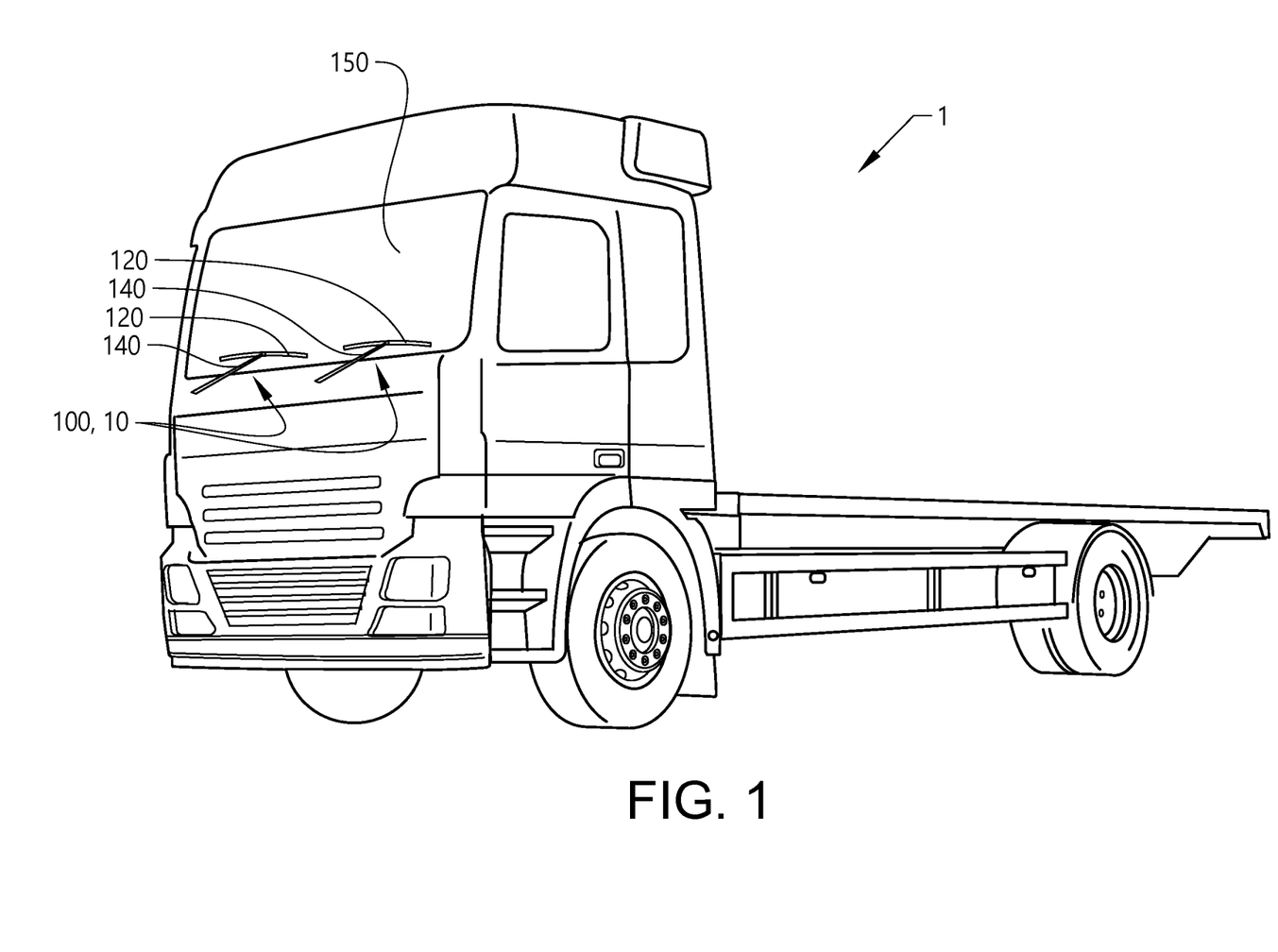
FIG. 1 is a lateral side view illustrating an example of vehicle in the form of a truck; the vehicle comprising a windscreen wiper system and a wiper connector assembly according to one example embodiment of the present invention.
Figure 2:
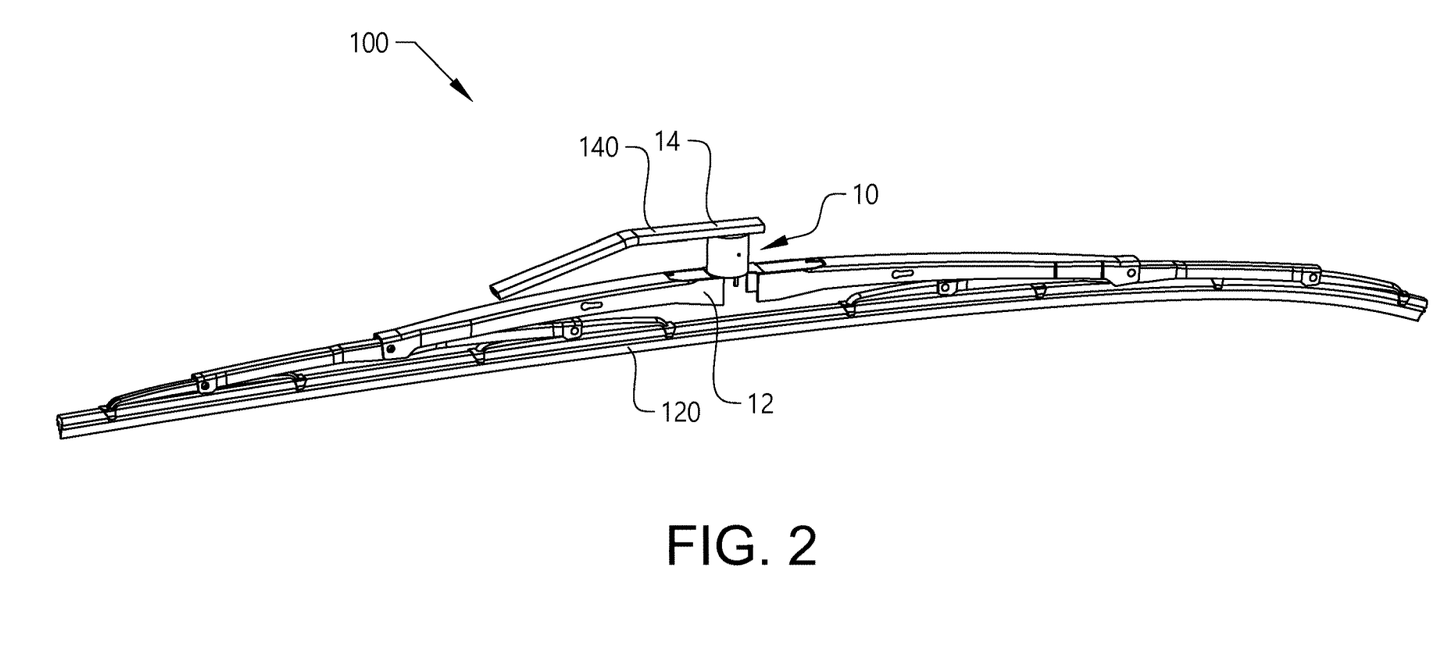
FIG. 2 schematically illustrates an example embodiment of an assembled windscreen wiper system comprising a wiper connector assembly according to the present invention.

With particular reference to FIG. 1, there is provided a vehicle 1 in the form of a truck. The vehicle comprises a front windscreen 150 and a windscreen wiper system 100 according to the example embodiments of the present disclosure. The windscreen wiper system 100 is particularly suitable for cleaning of the front windscreen 150 of a truck. FIG. 2 schematically illustrates an example embodiment of an assembled windscreen wiper system. The windscreen wiper system 100 comprises a wiper connector assembly 10 according to the present invention. In particular, the windscreen wiper system 100 comprises a wiper arm 140, a wiper blade 120 and the wiper connector assembly 10. The parts of the wiper connector assembly will be described in more detail in relation to the FIGS. 3-5, FIGS. 6*a* and 6*b*, and FIG. 7. Another example embodiment of a wiper connector assembly will be described in relation to FIG. 8. As will be further described herein, the wiper arm 140 is connected to the wiper blade 120 by the wiper connector assembly 10. Also, in this example embodiment, the windscreen wiper system optionally comprises a washer fluid hose for transporting washerfluid there through. One example of a washer fluid passage arrangement is illustrated in FIG. 7.

Moreover, the windscreen wiper system can be controlled by a control unit (not shown) of the vehicle. Typically, although strictly required, the windscreen wiper system includes a motor controllable by the control unit, or by a stalk and/or rain sensor etc., as is commonly known in the art.

Figure 3:
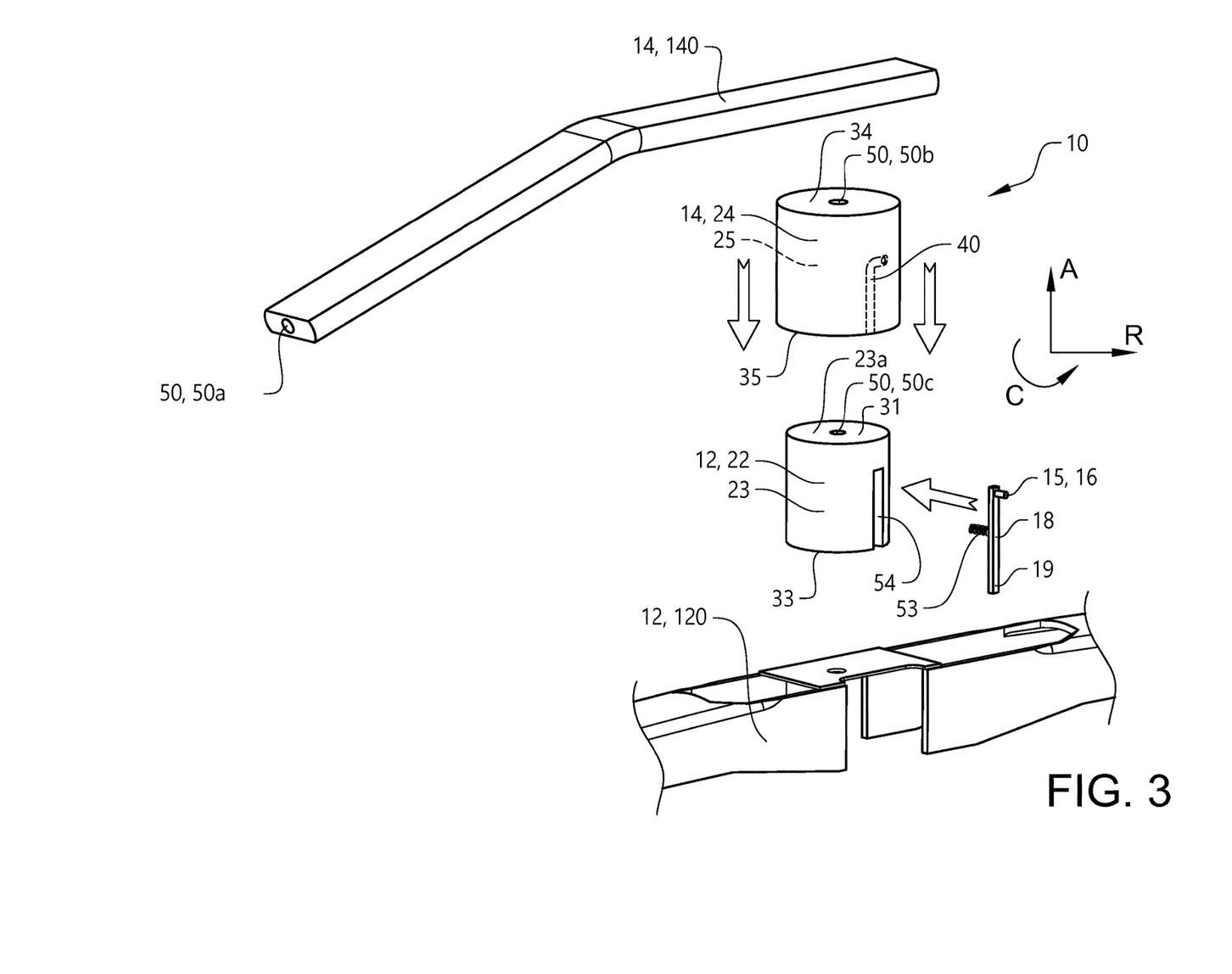
FIG. 3 is an exploded view of parts of an example embodiment of a wiper connector assembly according to the present invention.
Figure 4:
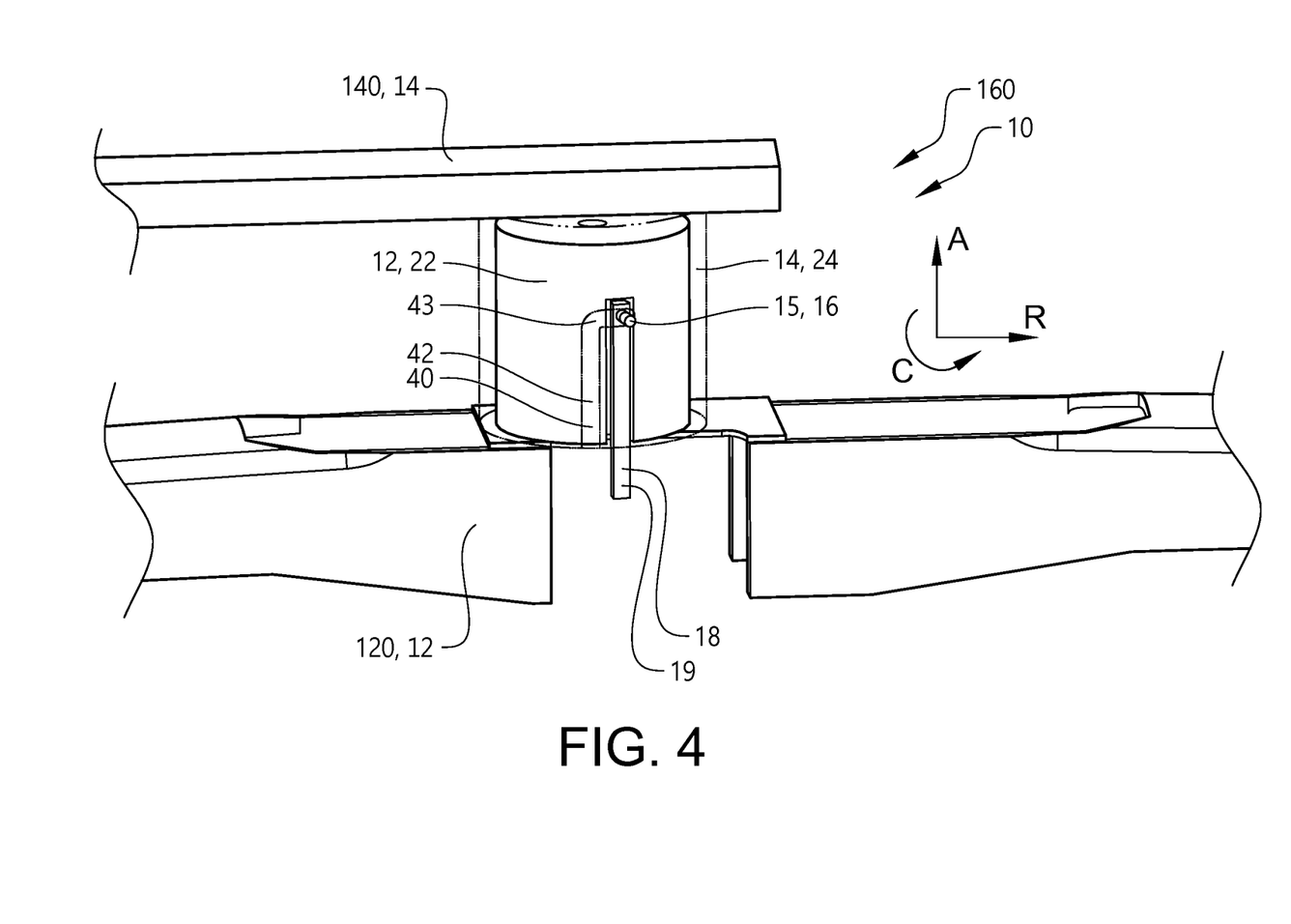
FIG. 4 schematically illustrate parts of an example embodiment of the wiper connector assembly, in which a male connector is in a fixed position relative a female connector, thereby forming the wiper connector assembly.

In order to describe the windscreen wiper system and the wiper connector assembly in further detail, reference is now made to FIG. 3, which is an exploded view of parts of the wiper connector assembly in FIGS. 1 and 2. In this example embodiment, the female connector 24 is a part of a wiper blade connector part 14 and the male connector 22 is part of a wiper arm connector part 12. The female connector 24 and the male connector 22 forms parts of the wiper connector assembly 10. That is, the male connector 22 and the female connector 24 connect the wiper blade connector part 12 to the wiper arm connector part 14, which is e.g. illustrated in FIG. 4. FIG. 4 schematically illustrate parts of an example embodiment of the wiper connector assembly, in which the male connector 12 is in a fixed position relative the female connector 14, thereby forming the wiper connector assembly 10.

As illustrated in e.g. FIGS. 3 and 4, the wiper connector assembly 10 typically extends in an axial direction A, a radial direction R and in a circumferential direction C. Accordingly, the male connector 12 typically extends in the axial direction A, the radial direction R and in the circumferential direction C. Analogously, the female connector 12 typically extends in the axial direction A, the radial direction R and in the circumferential direction C. It should be noted that the terms top, above, upper, upward, below, lower, base, downward and bottom, as well as any other similar terms are used in reference to the position of the assembly 10 as depicted in the drawings, e.g. FIGS. 2, 3 and 4, and the assembly may be positioned and used in other orientations.

The male connector 22 has an exterior 23. As illustrated in FIGS. 3 and 4, the male connector 22 has a biased protrusion 15 extending from the exterior 23 of the male connector in the radial direction R when the male connector is in an assembled configuration with a user-operable arm 18, as described below. According to one example embodiment, the shape of the male connector part resembles a cylinder. The male connector is typically at least partly made of a solid material, such as lightweight steel. The male connector 22 has a front end 31 and a rear end 33. The front end 31 of the male connector part is an annular front end insertable into the female connector 14. The male connector 22 has a front end surface 23a, which is a part of the exterior of the male connector. When the male connector is mounted to the female connector to form the wiper connector assembly, the front end surface 23a of the male connector is typically in contact with an inner axial end surface of the female connector, as illustrated in e.g. FIG. 4.

The biased protrusion 15 has a visual indicator portion 16, see e.g. FIGS. 3 and 4. Although not shown in the Figures, the visual indicator portion is typically provided by a colour, pattern or the like. By way of example, the visual indicator portion 16 corresponds to a colour different than the colour of the female connector 24. In this manner, it becomes possible to identify the biased protrusion in the through hole of the female connector 24 when the male connector is inserted in the female connector, and thereby conclude that the male connector 22 is in the fixation position relative the female connector 24, which is illustrated in e.g. FIG. 6a.

Further, as illustrated in FIGS. 3 and 4, the male connector 22 comprises the user-operable arm 18 configured to cooperate with the biased protrusion. The user-operable arm has a tab portion 19 reachable by a user from an outside of the male connector. Accordingly, the user-operable arm 18 has a tab portion grippable by a user from the outside of the wiper connector assembly 10. Typically, the user-operable arm 18 is connected to the biased protrusion 15. In this example, the user-operable arm 18 and the biased protrusion 15 are integral parts. However, the user-operable arm and the biased protrusion may also be separate parts connected together. By way of example, the biased protrusion 15 is a cylindrical shaped pin connected to the user-operable arm.

Figure 6A:
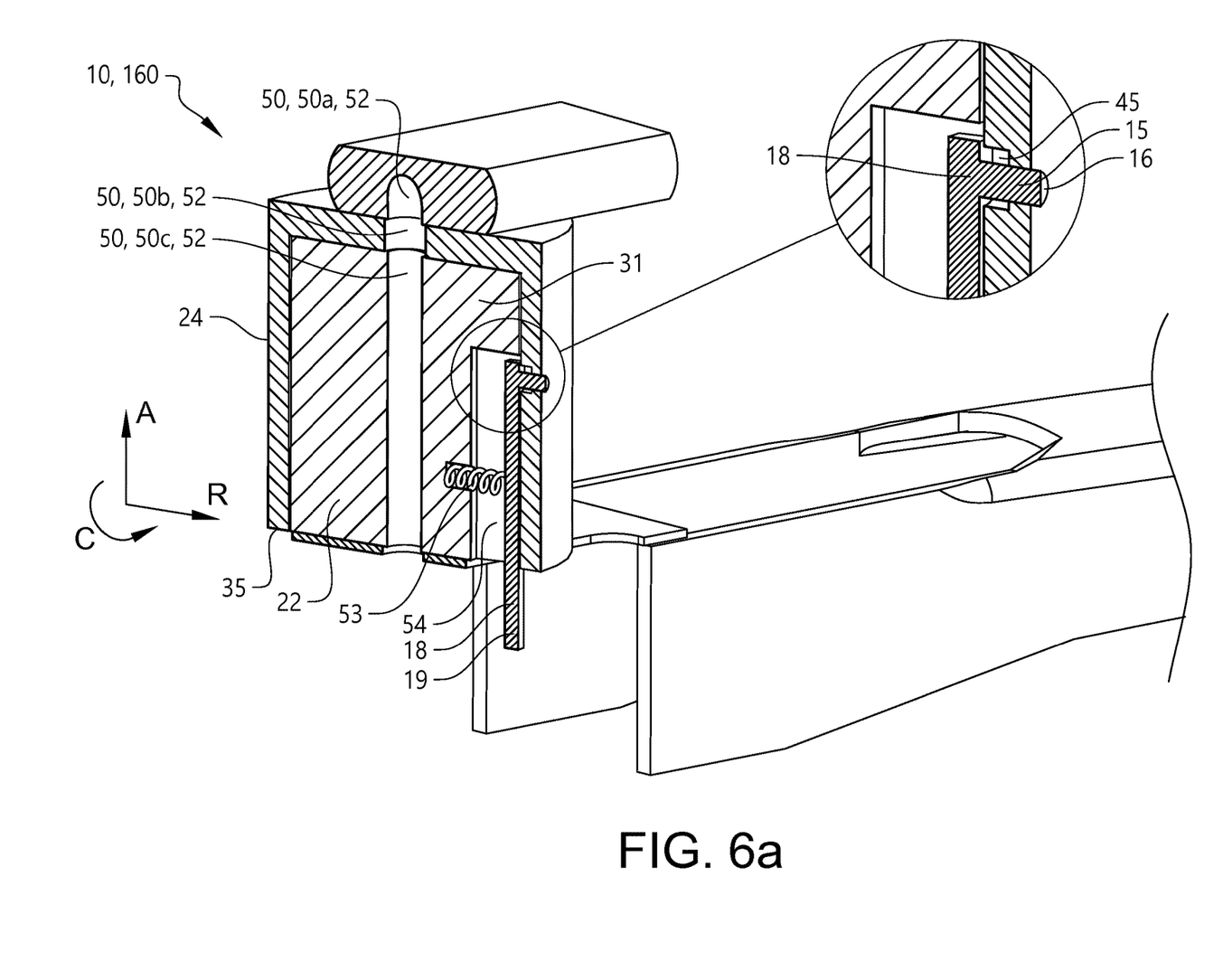
FIG. 6*a* is a cross sectional perspective view of an example embodiment of the wiper connector assembly, in which the male connector is in the fixed position relative the female connector, thereby forming the wiper connector assembly.
Figure 6B:
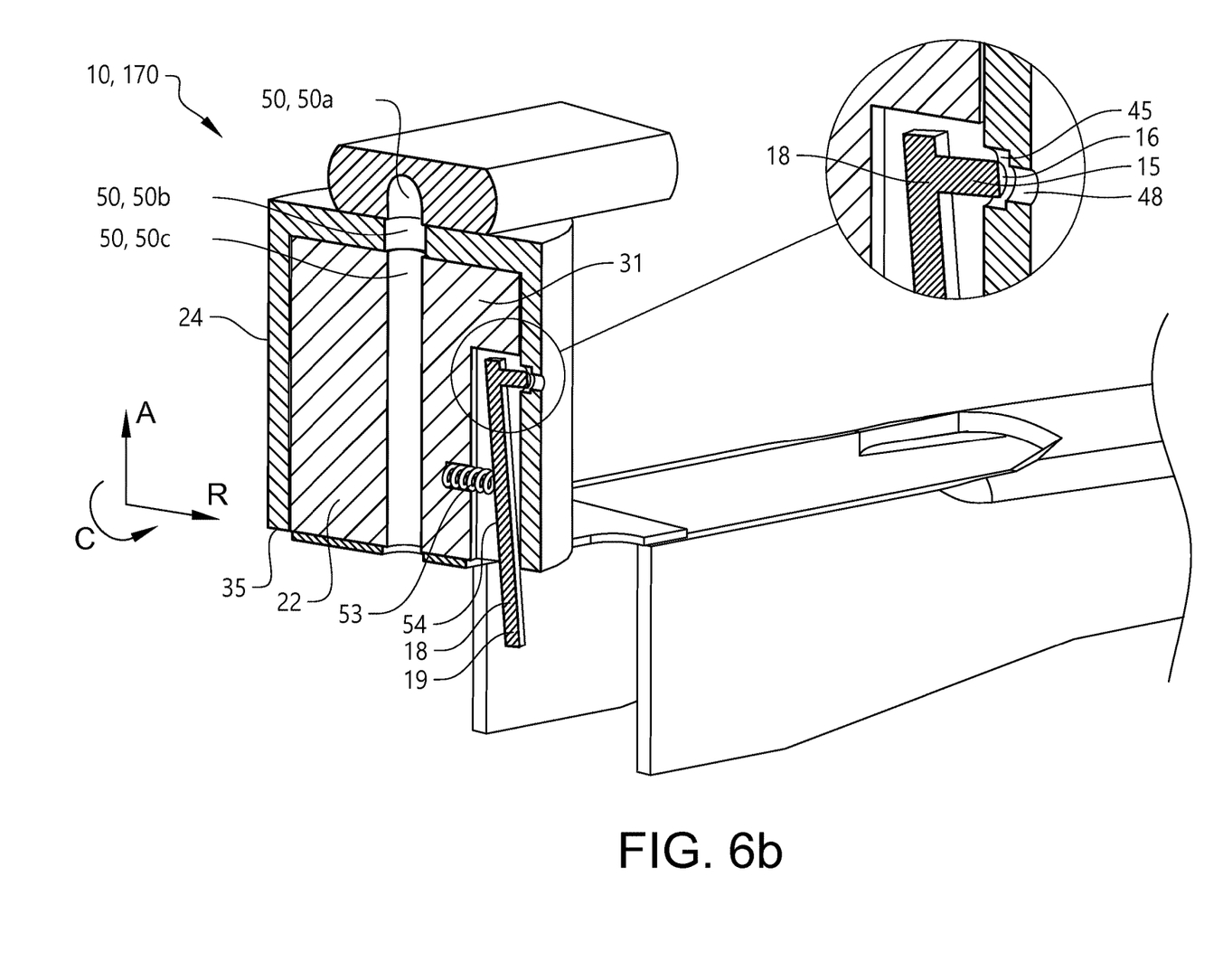
FIG. 6*b* is a cross sectional perspective view of an example embodiment of the wiper connector assembly, in which the male connector is in a released position relative the female connector, thereby forming the wiper connector assembly.
Figure 7:
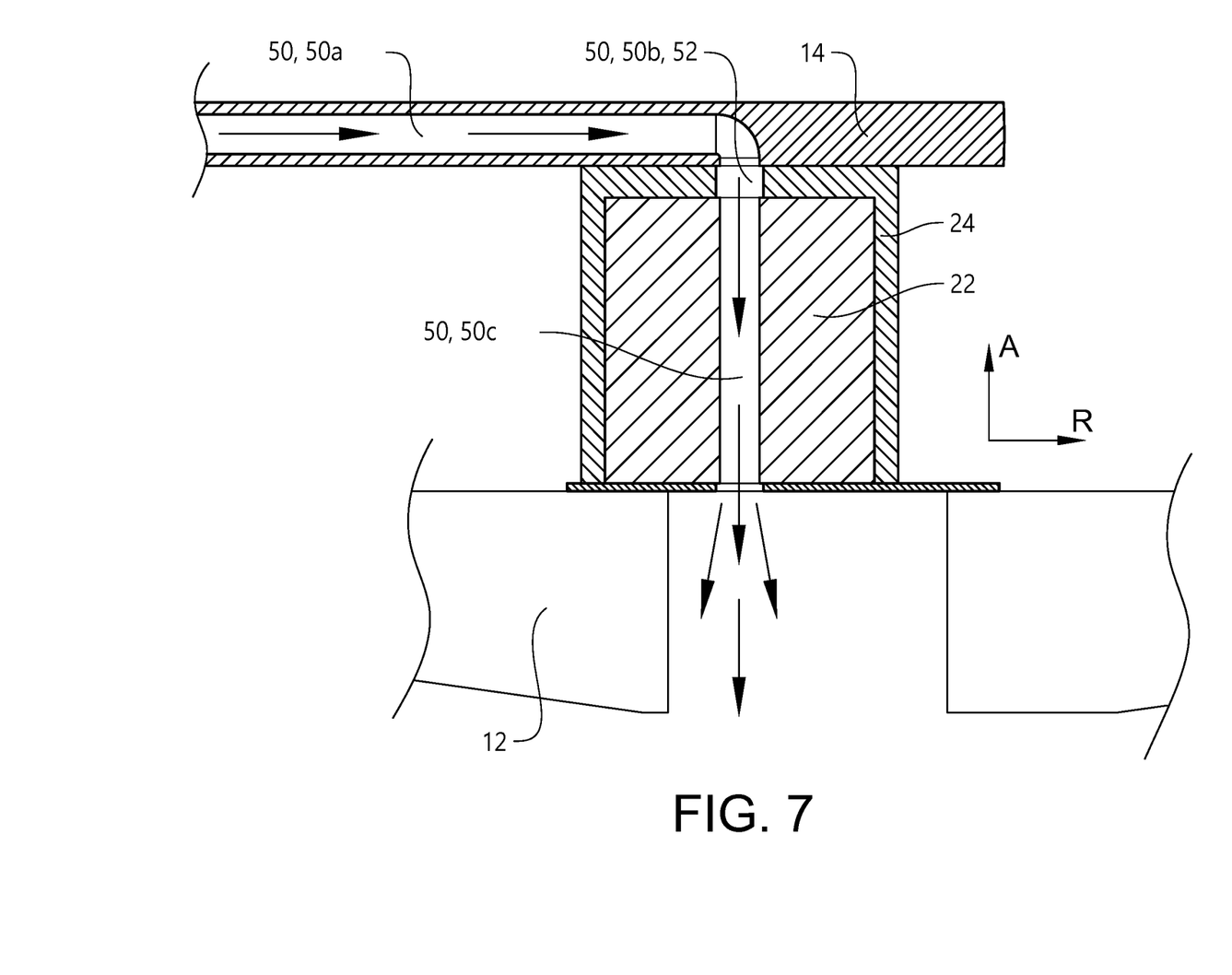
FIG. 7 schematically illustrates an example embodiment of a wiper connector assembly according to the present invention, in which the female connector and the male connector having corresponding washerfluid passages transporting washerfluid to the wiper blade.

As illustrated in e.g. FIGS. 6a and 6b, the biased protrusion 16 of the male connector is radially displaceable towards the exterior of the male connector by operating the tab portion 19 of the user-operable arm 18 inwardly in the radial direction R.

Turning again to FIGS. 3 and 4, the user-operable arm 18 extends generally axially of the male connector 22. Further, the user-operable arm in this example embodiment is spring-biased connected to the male connector. By way of example, the user-operable arm 18 is spring-biased connected to the male connector by means of a spring 53. The spring 53 is arranged in a recess 54 on the exterior of the male connector, as illustrated in FIG. 3, and also in FIGS. 6a and 6b. Thus, the male connector 22 typically comprises a space for accommodating the user-operable arm. By way of example, the male connector comprises the recess 54 defining the space for accommodating the user-operable arm 18. The recess extends generally in the axial direction of the male connector. In addition, in this example, the user-operable arm is spring-biased connected to the recess of the male connector. By way of example, the spring 53 is casted or welded to the male connector and the user-operable arm, so that the spring and the user-operable arm are attached to the male connector even when the male connector is separated from the female connector.

Figure 5:
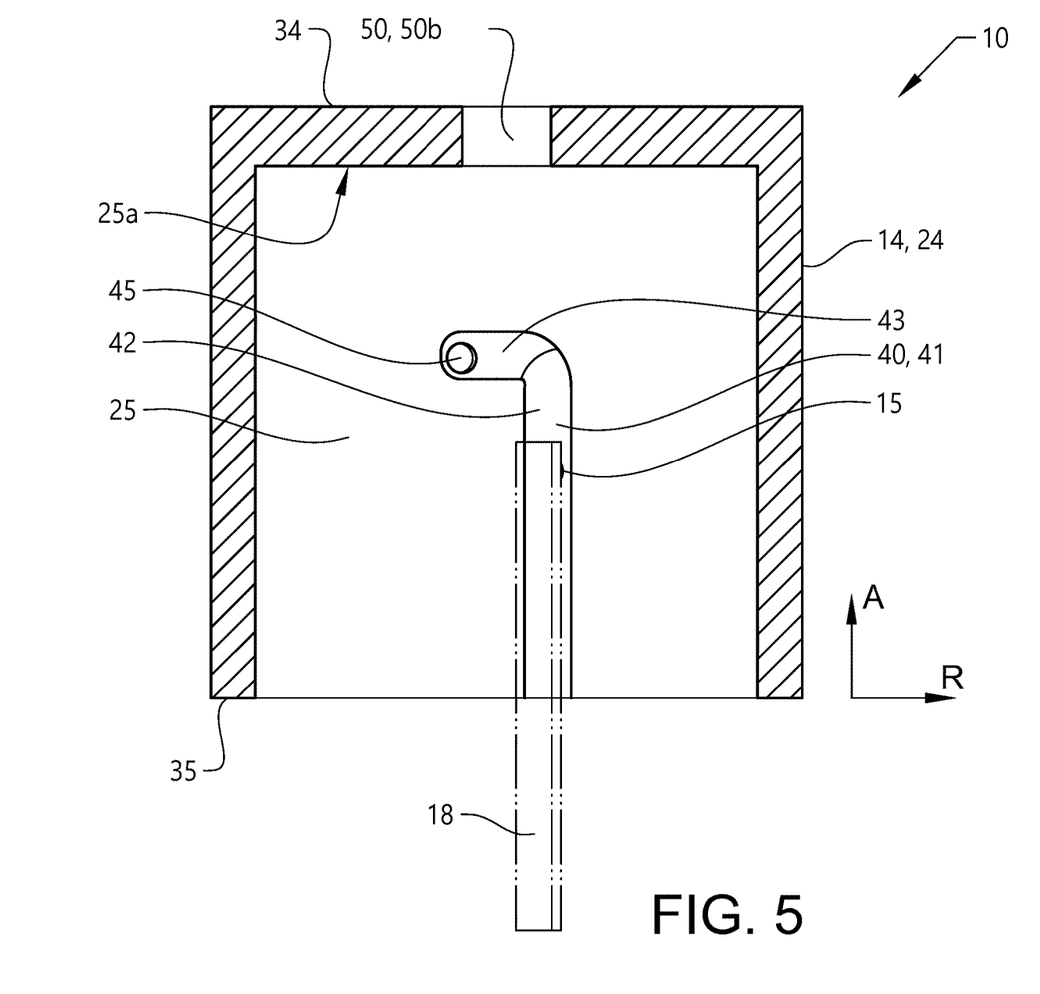
FIG. 5 is a cross sectional view of an example embodiment of the female connector of the wiper connector assembly in e.g.

Turning now to the female connector 24, while referring to e.g. FIGS. 3 and 4, and also FIG. 5, the female connector 24 is a part configured for receiving the male connector when forming or assembling the wiper connector assembly. FIG. 5 is a cross sectional view of an example embodiment of the female connector of the wiper connector assembly in e.g. FIG. 4. As illustrated in FIG. 5, the female connector has an interior surface 25. In this example, the interior surface is a circumferential interior surface defining an inner volume. According to one example embodiment, the shape of the female connector part resembles a hollow cylinder. Thus, the female connector is typically shaped as a hollow cylinder with an exterior surface and the interior surface defining the inner volume. By way of example, the inner volume is shaped to match the dimensions of the male connector. The female connector 24 also has an internal axial end surface 25a, as shown in FIG. 5. Moreover, the female connector has a front end 35 and a rear end 34, as shown in FIGS. 3 and 5. The front end 35 of the female connector 24 is typically an annular front end defining an annular receiving end for receiving the male connector. Moreover, the front end is a receiving end 35 for the male connector. That is, the front end is the male connector receiving end 35 of the female connector.

The female connector 24 comprises a groove 40 disposed on the interior surface 25. As illustrated in e.g. FIG. 5, the groove 40 defines a path 41 for the biased protrusion of the male connector. The groove 40 further has a groove end 45 comprising a through hole for the biased protrusion 15.

As illustrated in e.g. FIG. 5, the groove path has a first path section 42 extending substantially in the axial direction A and a subsequent second path section 43 extending from the first path section 42 and substantially in the circumferential direction C along the interior surface of the female connector. The groove path also has a thickness, typically corresponding to the radial direction of the groove path.

It is to be noted that the radial extension of the recess 54 of the male connector and the radial extension of the groove path should at least together accommodate for the total length of the biased protrusion (including the dimensions of the user-operable arm) as seen in the radial direction.

Turning now to the operation of the male connector 22 and the female connector 24 so as to set the wiper connector assembly in the fixation position. FIG. 6a is a cross sectional perspective view of the wiper connector assembly, in which the male connector is in the fixed position 160 relative the female connector, while FIG. 6b is a cross sectional perspective view of the wiper connector assembly, in which the male connector is in a released position 170 relative the female connector. In order to set the male connector 22 in the fixed position relative the female connector 24, the male connector is inserted into the female connector. In particular, the front end 31 of the male connector 22 is inserted in the receiving end 35 of the female connector, while the user-operable arm 18 is manipulated to retract the biased protrusion 15 to a retracted position (FIG. 6b), which is possible as the user-operable arm is spring-biased connected to the male connector. Typically, the biased protrusion 15 is fully retracted by the user-operable arm 18 during insertion of the male connector. Accordingly, the front end 31 of the male connector is a leading end. Subsequently, the biased protrusion 15 of the male connector is guided to the groove end 45 and the through hole 48 via the groove 40 and the groove path 41. That is, the user displaces the male connector 22 relative the female connector by displacing the biased protrusion 15 in the first path section 42 and subsequently in the second path section 43 to the groove end 45. At this location in the groove end, the biased protrusion 15 is permitted to move outwards in the radial direction R due to the through hole 48 in the female connector. In this position, as illustrated in FIG. 6a, the male connector is fixated relative the female connector to obtain the fixation position 160, while the visual indicator portion 16 is capable of providing a visible indication of the fixation position 160 to the user by the visual indicator portion 16.

It is to be noted that the biased protrusion is typically displaced in the groove by an axial movement of the female connector relative the male connector and a rotational movement of the female connector relative the male connector. That is, the biased protrusion is typically displaced in the first path section 42 by an axial movement of the female connector relative the male connector and in the second path section 43 by a rotational movement of the female connector relative the male connector.

When the male connector is in the fixed position relative the female connector, the male connector and the female connector forms a connecting position, in which the male connector engages with the female connector by setting the biased protrusion in a fully extracted position due to the spring 53 acting on the biased protrusion 15 in the radial direction R, as shown in FIG. 6a.

The male connector 22 can then be disconnected from the fixation position 160 (with the female connector) by pushing the user-operable arm 18 inwardly in the radial direction R, as illustrated in FIG. 6b. The male connector is then dismounted from the female connector by displacing the biased protrusion 15 in the groove 40 of the female connector, as mentioned above. Thereby, the male connector 22 can be released from the fixation position 160 with the female connector 24.

In order to adapt the wiper connector assembly for distributing washerfluid to the wiper blade, the wiper connector assembly 10 comprises a fluid passage 50 for the flow of washerfluid there through. FIG. 7 schematically illustrates an example embodiment of a wiper connector assembly 10, in which the female connector 24 and the male connector 22 have corresponding washerfluid passages 50b and 50c for transporting washerfluid to the wiper blade. Typically, the passage 50 extends through the male connector 22 and the female connector 24. Also, the wiper arm part 14 has a passage 50a. The passage 50a of the wiper arm part 14 is connected to the washerfluid passage 50b. Subsequently, the washerfluid is transported through a hole in the wiper blade part 12 and the wiper blade 120 and towards the front windscreen of the vehicle.

Optional, the wiper connector assembly 10 comprises a sealing 52 arranged to provide a fluid-tight connection for the passage in-between the male connector 22 and the female connecter 24. By way of example, the sealing 52 is arranged about the fluid washerfluid 50 and in-between the interface of the male connector 22 and the female connector 24, which is schematically illustrated in FIG. 7. The sealing 52 is configured to cooperate with the front end surface 23a of the exterior of the male connector and an internal surface 25a of the interior of the female connector for providing the fluid-tight connection therebetween.

Figure 8:
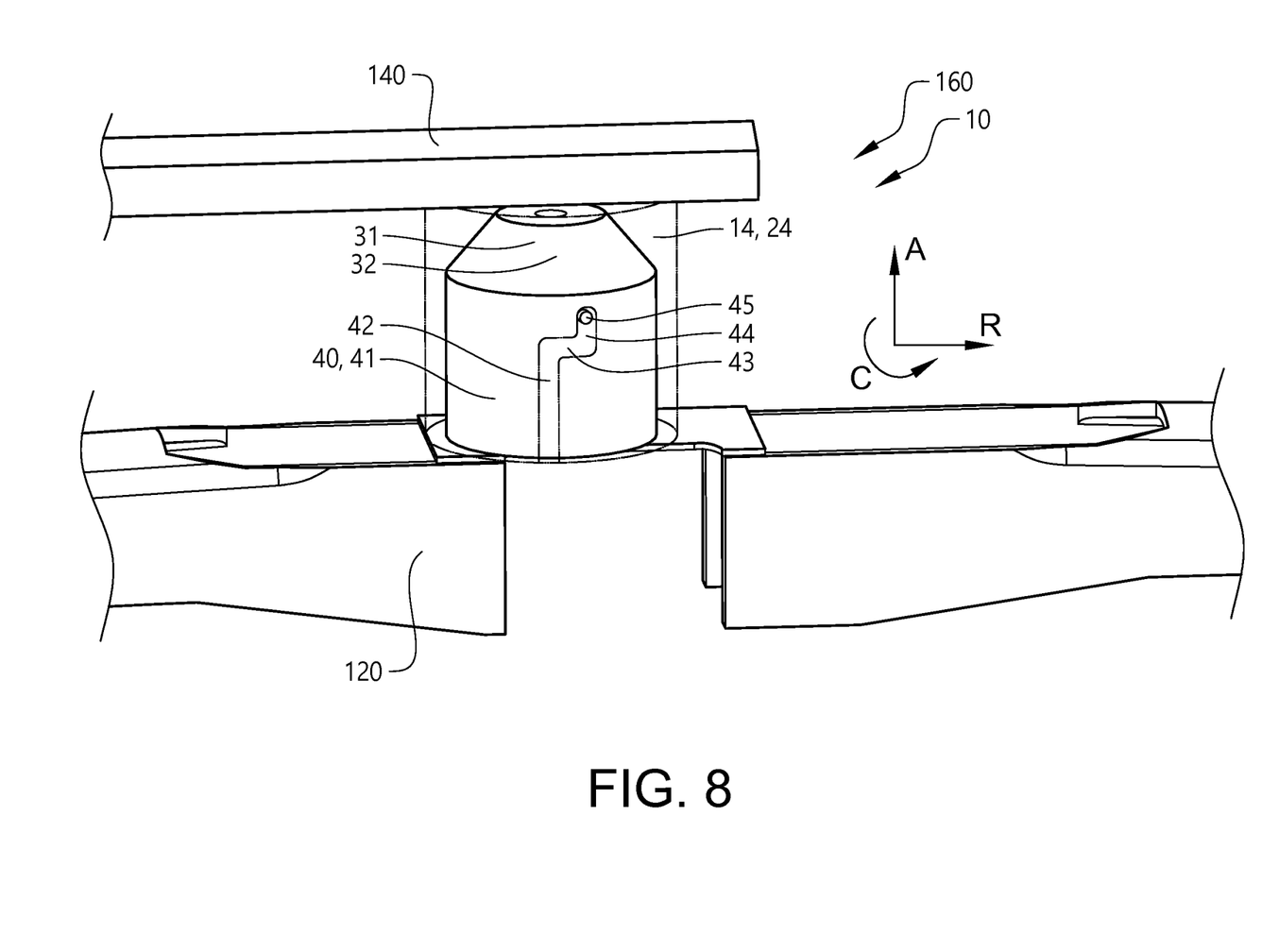
FIG. 8 schematically illustrates another example embodiment of a wiper connector assembly according to the present invention.

Another example of a conceivable groove of the female connector 14 of the wiper connector assembly is illustrated in FIG. 8. In this example, the groove path has a third path section 44 extending substantially in the axial direction A from the second path section 43. That is, the groove defines a path for the biased protrusion of the male connector and having the groove end 45 comprising the through hole for the biased protrusion. In addition, the groove path has a first path section 42 extending substantially in the axial direction A, the subsequent second path section 43 extending from the first path section and substantially in the circumferential direction C along the interior surface and the third path section 44 extending substantially in the axial direction A from the second path section 43 to the groove end 45. The example as depicted in FIG. 8 may include any other feature, aspect or function as described in relation to the example embodiment as described above in relation to FIGS. 1 to 7, as long as there is no contradiction between the features of the examples.

In addition, as illustrated in FIG. 8, the front end 31 of the male connector in this example resembles a truncated cone 32. In order to match the shape of the male connector, the interior of the female connector in this example defines an inner truncated cone-shaped space and a cylindrical-shaped space extending from the inner truncated cone-shaped space to the receiving end of the female connector.

It is to be noted that any numerical designations, such as "first" or "second" are illustrative only and are not intended to limit the scope of the invention in any way.

It is to be understood that the present invention is not limited to the embodiments described above and illustrated in the drawings; rather, the skilled person will recognize that many changes and modifications may be made within the scope of the appended claims. In particular, while the example embodiments are described in relation to an example when the male connector 22 is a part of the wiper blade connector part 12 and the female connector 24 is part of the wiper arm connector part 14, the male connector 22 may likewise be a part of the wiper arm connector part 14, while the female connector 24 is part of the wiper blade connector part 12.

Also, it should be readily appreciated that although some components are mentioned as having circular cross sections, the dimensions and shapes of these components may likewise be provided in other shapes and dimensions, such as components having cross sections resembling oval-, rectangular- and triangular-shaped cross sections, or any other conceivable cross-section, as long as nothing else is mentioned in relation to these components and the components can provide their functions.

The invention claimed is:

1. A wiper connector assembly for a vehicle, comprising:
a wiper blade connector part; and
a wiper arm connector part, wherein:
one of the wiper arm connector part and the wiper blade connector part is a male connector and the other one a female connector for connecting the wiper blade connector part to the wiper arm connector part; and
the male connector comprises:
a biased protrusion extending from an exterior of the male connector in a radial direction of the male connector and having a visual indicator portion; and
a user-operable arm configured to cooperate with the biased protrusion and having a tab portion reachable by a user from an outside of the male connector; wherein:
the female connector defines an interior surface and comprises a groove disposed on the interior surface, the groove defining a groove path for the biased protrusion of the male connector and having a groove end comprising a through hole for the biased protrusion;

the groove path having at least a first path section extending substantially in an axial direction and a subsequent second path section extending from the first path section and substantially in a circumferential direction along the interior surface of the female connector; and the male connector is connectable to the female connector by inserting a front end of the male connector in a receiving end of the female connector and displacing the biased protrusion in the first path section and subsequently in the second path section to the groove end, whereby the biased protrusion is permitted to move outwards in the radial direction, thereby fixating the male connector relative the female connector, while providing a visible indication of a fixation position to a user by the visual indicator portion.

2. The wiper connector assembly of claim 1, wherein the biased protrusion of the male connector is radially displaceable towards the exterior of the male connector by operating the tab portion of the user-operable arm inwardly in the radial direction, thereby releasing the male connector from the fixation position with the female connector.

3. The wiper connector assembly of claim 1, wherein the groove path has a third path section extending substantially in the axial direction from the second path section.

4. The wiper connector assembly of claim 1, wherein the wiper connector assembly comprises a fluid passage for a flow of washer fluid therethrough, the passage extending through the male connector and the female connector.

5. The wiper connector assembly of claim 4, wherein the wiper connector assembly comprises a sealing arranged to provide a fluid-tight connection for the passage in-between the male connector and the female connecter.

6. The wiper connector assembly of claim 5, wherein the sealing cooperates with a front end surface of the exterior of the male connector and an internal surface of the interior of the female connector for providing the fluid-tight connection therebetween.

7. The wiper connector assembly of claim 1, wherein a front end of the male connector resembles a truncated cone.

8. The wiper connector assembly of claim 1, wherein the interior of the female connector defines an inner truncated cone-shaped space and a cylindrical-shaped space extending from the inner truncated cone-shaped space to the receiving end of the female connector.

9. A windscreen wiper system comprising:
a wiper arm,
a wiper blade, and
a wiper connector assembly, comprising:
  a wiper blade connector part; and
  a wiper arm connector part, wherein:
  one of the wiper arm connector part and the wiper blade connector part is a male connector and the other one a female connector for connecting the wiper blade connector part to the wiper arm connector part; and
  the male connector comprises:
    a biased protrusion extending from an exterior of the male connector in a radial direction of the male connector and having a visual indicator portion, and
    a user-operable arm configured to cooperate with the biased protrusion and having a tab portion reachable by a user from an outside of the male connector; wherein:
  the female connector defines an interior surface and comprises a groove disposed on the interior surface, the groove defining a groove path for the biased protrusion of the male connector and having a groove end comprising a through hole for the biased protrusion;
  the groove path having at least a first path section extending substantially in an axial direction and a subsequent second path section extending from the first path section and substantially in a circumferential direction along the interior surface of the female connector; and
  the male connector is connectable to the female connector by inserting a front end of the male connector in a receiving end of the female connector and displacing the biased protrusion in the first path section and subsequently in the second path section to the groove end, whereby the biased protrusion is permitted to move outwards in the radial direction, thereby fixating the male connector relative the female connector, while providing a visible indication of a fixation position to a user by the visual indicator portion;
  wherein the wiper arm is connected to the wiper blade by the wiper connector assembly.

10. The windscreen wiper system of claim 9, further comprising a washer fluid hose for transporting washer fluid therethrough.

11. A vehicle comprising:
a front windscreen and
a wiper connector assembly comprising:
  a wiper blade connector part; and
  a wiper arm connector part, wherein:
  one of the wiper arm connector part and the wiper blade connector part is a male connector and the other one a female connector for connecting the wiper blade connector part to the wiper arm connector part; and
  the male connector comprises:
    a biased protrusion extending from an exterior of the male connector in a radial direction of the male connector and having a visual indicator portion, and
    a user-operable arm configured to cooperate with the biased protrusion and having a tab portion reachable by a user from an outside of the male connector; wherein:
  the female connector defines an interior surface and comprises a groove disposed on the interior surface, the groove defining a groove path for the biased protrusion of the male connector and having a groove end comprising a through hole for the biased protrusion;
  the groove path having at least a first path section extending substantially in an axial direction and a subsequent second path section extending from the first path section and substantially in a circumferential direction along the interior surface of the female connector; and
  the male connector is connectable to the female connector by inserting a front end of the male connector in a receiving end of the female connector and displacing the biased protrusion in the first path section and subsequently in the second path section to the groove end, whereby the biased protrusion is permitted to move outwards in the radial direction, thereby fixating the male connector relative the female connector, while providing a visible indication of a fixation position to a user by the visual indicator portion.

* * * * *